Jan. 12, 1943. A. H. EMERY 2,307,831
COMPARATOR
Filed July 8, 1942
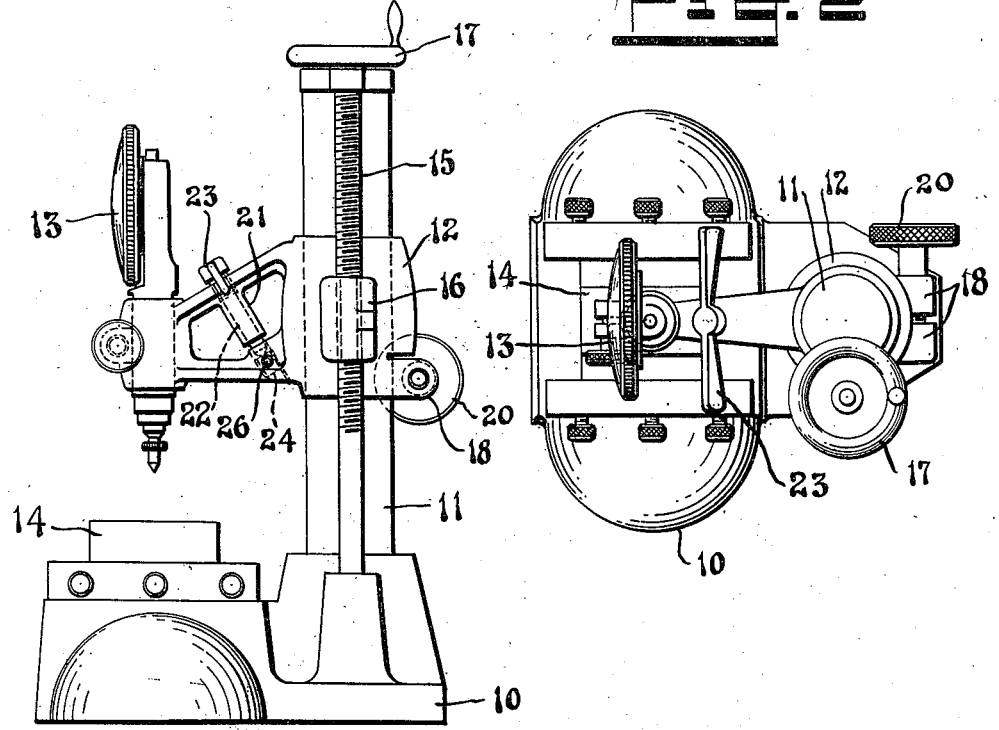
INVENTOR.
Alfred H. Emery
BY
Darby & Darby
ATTORNEYS Patented Jan. 12, 1943

2,307,831

UNITED STATES PATENT OFFICE 2,307,831

COMPARATOR

Alfred Hamilton Emery, Wappingers Falls, N. Y., assignor to Standard Gage Company, Inc., Poughkeepsie, N. Y., a corporation of New York Application July 8, 1942, Serial No. 450,162

1 Claim. (Cl. 33—147)

The present invention relates to gauges, and particularly to that type of gauge commonly designated comparators. More particularly still the invention relates to the fine adjustment of a gauge of the foregoing type.

In the past it has been customary in the case of comparators or height gauges to provide both a fine and a coarse adjustment, each of which was comprised primarily of a screw thread, the pitch of the screws being in accordance with the type of adjustment desired. Also in such gauges it was common to provide a means for locking the gauge or the gauge supporting member to the supporting column after it had been adjusted to its full position. It was almost invariably true, however, that the locking arrangement tended to throw out the adjustment, with the result that it was almost impossible, except with a long, tedious, trial and error process, to accurately adjust the gauge and bracket to its desired position.

In the present invention the coarse adjustment is obtained by use of the ordinary screw thread arrangement but the fine adjustment is obtained by slightly distorting the web of the gauge supporting bracket, this distortion being procured by means of a screw acting against the resilience of the metal web. It has been found that with this adjusting method there is no need of any locking device, and if once set the instrument retains the setting indefinitely.

It is an object of the invention to provide a comparator having a fine adjustment means which retains its setting, and which requires no locking means whatever.

It is a further object of the invention to provide a means for fine adjustment which is simple and positive in operation, and at the same time economical to manufacture.

Further objects and features of the invention will appear when the following description is considered in connection with the annexed drawing, in which Figure 1 is a side elevational view of a comparator gauge embodying my invention;

Figure 2 is a plan view of the gauge structure of Figure 1; and

Figure 3 is a cross-section of the gauge supporting web showing the details of the fine adjustment means of my invention.

Referring now to the drawing, there is shown in Figures 1 and 2 a base member 10 having affixed thereto the usual vertical column 11 on which slides the horizontal bracket 12 which supports the dial gauge 13, all of these parts being of usual form. The bracket 12 is adjusted in position above the usual anvil 14 by means of the screw 15 which cooperates with the internally threaded boss 16 extending from bracket 12. The screw 15 is provided with the handwheel 17 by means of which the coarse adjustment of the position of the bracket 12 on the column 11 is procured. The lower part of the portion of bracket 12 which surrounds the column 11 is split in the usual fashion, as shown at 18 in Figure 2, in order that knurled headed locking screw 20 may clamp the bracket 12 to the column 11.

All of the above structure is old, but usually there is provided a separate boss riding on the column 11 which is effected by the coarse adjustment such as described above, and a screw extending from that boss to the horizontal arm such as 12, this screw having a fine pitch and comprising the fine adjustment of the instrument when adjusting the height of the plunger of the dial gauge above the anvil such as 14. As indicated above, when this structure is used, the locking arrangement is provided on the arm 12, and when this locking arrangement is operated it almost invariably causes a deviation from the previously carefully made fine adjustment.

In the present instance the horizontally extending portion of the arm 12 instead of being solid is a web of material having a central portion, indicated at 21 in Figure 3, which is drilled and through which extends a conically pointed pin 22 which is threaded near its upper end and provided with a wing nut 23. The threaded portion of the pin 22 cooperates with tapped threads in the upper portion of the web, and it will be seen that by this means the position of the pin with respect to the web may be altered.

In alignment with the pin 22 in the lower portion of the web there is drilled a hole into which is screwed a block 24 having a conical depression 25 therein. The block 24 may be locked into an adjusted position by means of any suitable device such as the set screw 26 (see Figure 1).

In operation the arm or bracket 12 is raised by means of rotation of the handwheel 17, and is then lowered upon the surface of the standard to which the gauge is to be set. Thereafter the locking screw 20 is operated and the arm clamped to the column 11 in the adjusted position. This locking distorts the prior adjustment and consequently the dial gauge 13 which should be set at the zero point is no longer so set. Therefore, the wing nut 23 is moved clockwise or counter-clockwise as the case may be until the pointer is again brought back to zero. This operation, of course, produces distortion particularly in the upper portion of the web of arm 12, and in so doing adjusts the gauge to the proper position which it will maintain due to the resiliency of the web for an indefinite period. In order to provide for wear upon the end of the screw or pin 22, and also in order to take care of any possible permanent distortion in the web the adjustable block 24 is provided. This block, as has been indicated above, is adjustable in position by virtue of the fact that it is threaded into the lower portion of the web.

I have described my adjusting means for procuring fine adjustment as embodied in a comparator. It will be obvious that it is equally useful in many other structures, and I therefore wish to be limited not by the foregoing description, but only by the appended claim.

What I claim is:

A fine adjustment means for a gage or the like comprising a gage supporting bracket of webbed construction with a central portion of the web split, a screw extending through the upper portion of the split web and bearing against the lower portion thereof, the screw threads serving to cause distortion of the web to adjust the position of the gage, the resilience of the web acting against the screw threads serving to lock the web in its distorted position and means comprising a block in the lower web positioned to cooperate with the said web distorting screw and to act as a bearing surface for that screw, said last mentioned means being adjustable in the web to compensate for wear on the screw or upon its own surface.

ALFRED HAMILTON EMERY.